US00RE37405B1

(19) United States
(12) Reissued Patent
Shirodera

(10) Patent Number: US RE37,405 E
(45) Date of Reissued Patent: Oct. 9, 2001

(54) PARTS FEEDER

(75) Inventor: Tatsumi Shirodera, Toyama-ken (JP)

(73) Assignee: YKK Corporation, Tokyo (JP)

(21) Appl. No.: 09/470,602

(22) Filed: Dec. 22, 1999

Related U.S. Patent Documents

Reissue of:
(64) Patent No.: 5,702,028
Issued: Dec. 30, 1997
Appl. No.: 08/736,081
Filed: Oct. 24, 1996

(30) Foreign Application Priority Data

Oct. 30, 1995 (JP) ..... 7-282193

(51) Int. Cl.[7] ..... B23Q 7/12
(52) U.S. Cl. ..... 221/166; 221/168; 221/172; 209/615; 209/920; 198/390; 198/396
(58) Field of Search ..... 209/606, 615, 209/644, 920, 921, 925; 221/163, 164, 166, 167, 168, 172; 198/396, 398, 389, 390

(56) References Cited

U.S. PATENT DOCUMENTS

| | | | |
|---|---|---|---|
| 2,656,085 | 10/1953 | Schmied | 221/166 |
| 2,998,119 | 8/1961 | Winberg | 221/166 X |
| 3,116,544 | 1/1964 | Fisher | 221/166 X |
| 4,079,831 | 3/1978 | Greider | 198/396 |
| 4,114,762 | 9/1978 | Beal et al. | 209/615 |
| 4,407,402 | 10/1983 | Nishimura et al. | 198/396 |
| 4,648,501 * | 3/1987 | Grant | 198/398 X |
| 4,732,296 | 3/1988 | Heck et al. | 221/172 |

FOREIGN PATENT DOCUMENTS

| | | |
|---|---|---|
| 0 191 620 | 8/1986 | (EP) . |
| 1 379 964 | 1/1975 | (GB) . |

* cited by examiner

*Primary Examiner*—Tuan N. Nguyen
(74) *Attorney, Agent, or Firm*—Finnegan, Henderson, Farabow, Garrett & Dunner, L.L.P.

(57) ABSTRACT

A parts feeder for conveying a succession of parts in a common posture, includes: a rotary drum rotatable about its substantially horizontal axis of rotation and having on its inner circumferential wall surface a plurality of radial plates circumferentially spaced at predetermined distances; a chute in the form of an elongated plate substantially horizontally extending from an inside to an outside of the rotary drum through an outlet and having a guide portion along its upper edge; a vibrator supporting the chute for vibrating the chute longitudinally; a remover disposed adjacent to the guide portion for removing any of the parts if it is abnormal in posture while being conveyed on the guide portion of the chute; and the guide portion having a parts-supporting cross-sectional shape gradually varying from an inner end of the chute outwardly toward the outlet of the rotary drum.

4 Claims, 7 Drawing Sheets

PARTS FEEDER

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a parts feeding apparatus for successively feeding parts from a parts collection drum to the next station, and more particularly to a parts feeder suitable for various kinds of parts having a unique cross-sectional shape and a directivity and for feeding such parts in correct posture.

2. Description of the Related Art

Conventionally, in manufacturing articles, such as slide fasteners, each comprising a plurality of parts of different shapes, the individual parts are fed successively, in the order of attaching, to a parts attaching station where the individual parts are attached to a fastener chain at a predetermined position in the same posture. For this purpose, as disclosed in, for example, Japanese Patent Laid-Open Publication No. Hei 5-178447, a so-called bowl-type parts feeder is generally used which comprises a bottomed vibrating bowl, with a spiral parts guide along an inside wall surface, and a chute in the form of a plate extending between an outlet of the spiral parts guide in the bowl and the parts attaching station.

A drum-type parts feeder for slide fastener sliders is disclosed in, for example, U.S. Pat. No. 3,116,544. The parts feeder comprises a horizontal drum to be driven for one-way rotation about a substantially horizontal axis, a rotary screw shaft extending from inside of the horizontal drum to outside of the drum along the drum axis, and a chute in the form of a plate disposed adjacent to the circumferential surface of the rotary screw shaft and extending outwardly from the drum in parallel to the drum axis. The horizontal drum has on its inside wall surface a plurality of plates extending radially inwardly and spaced from one another at a predetermined phase angle. Many parts accumulated in the horizontal drum are scooped by the radial plates in response to rotation of the horizontal drum and, when the individual wing comes to a position diagonally upwardly of the drum, the parts drop from the wing via a gutter and are caught and received by the upper edge of the chute.

Subsequently, the parts are fed on and along the chute outwardly of the drum in response to the turn of the rotary screw shaft. During that time, if the individual parts supported on the chute are out of predetermined posture, a pin projecting radially from the outlet-side end of the rotary screw shaft hits one end of a lever, which is mounted at the outlet of the chute, at every rotation of the rotary screw shaft to pivotally move the other end of the lever upwardly, thereby removing the out-of-predetermined-posture parts from the chute.

However, in the bowl-type parts feeder disclosed in Japanese Patent Laid-Open Publication No. Hei 5-178447, since the feeding of parts depends on circumferential vibration of-the bowl, it is not only difficult to transfer the parts smoothly to the spiral guide but not easy to advance the parts smoothly on the guide, thus causing only a limited increase of parts feeding speed. Also there is no guarantee that the parts are reliably transferred from the spiral guide to the plate-like chute.

In the drum-type parts feeder disclosed in U.S. Pat. No. 3,116,544, since the parts feed speed depends on the rotation of the rotary screw shaft, it is theoretically possible to increase the parts feed speed by increasing the number of rotations of the screw shaft. However, the parts tend to drop from the chute due to their shape during feeding, and the individual parts once ridden on the chute cannot advance by itself unless succeeding parts are fed. Further, since there is no means for removing any parts remaining not advanced on the chute during feeding, it would be inevitable to stop operating the whole machine if such stagnation of parts occurs, thus causing only a limited rate of production.

SUMMARY OF THE INVENTION

With the foregoing problems in view, it is an object of this invention to provide a parts feeder which can feed a succession of parts reliably and smoothly in predetermined posture and can realize a high-speed delivery in a stabled operation for a long time.

According to this invention, the above object is accomplished by a parts feeder for conveying a succession of parts in common posture, comprising: a rotary drum rotatable about its substantially horizontal axis of rotation and having on its inner circumferential wall surface a plurality of radial plates circumferentially spaced at predetermined distances; a feed chute in the form of an elongated plate substantially horizontally extending from an inside to an outside of the rotary drum through an outlet and having a guide portion along its upper edge; a vibrator supporting the chute for vibrating the chute longitudinally; a remover disposed adjacent to the guide portion for removing any of the parts if it is abnormal in posture while being conveyed on the guide portion of the chute; and the guide portion having a parts-supporting cross-sectional shape gradually varying from an inner end of the chute outwardly toward the outlet of the rotary drum.

In a preferred form, the rotary drum has at one end a bottom and is inclined slightly with respect to the horizontal with the bottom on the down side, the chute slightly sloping down for the inner end toward the outside of the rotary drum, and the remover is composed of an abnormal-posture parts removing mechanism for removing parts being fed in abnormal posture on the guide portion and a stagnant parts removing mechanism for removing parts stagnated in the guide portion.

In a further preferred form, the parts feeder includes a detector disposed adjacent to the guide portion for successively detecting the parts being conveyed on the guide portion, and a controller for measuring a time interval of detection of adjacent parts by the detector and for activating the stagnant parts removing mechanism when the time interval exceeds a preset value.

DETAILED DESCRIPTION OF THE PREFERRED EMBODIMENTS

Figure 1:
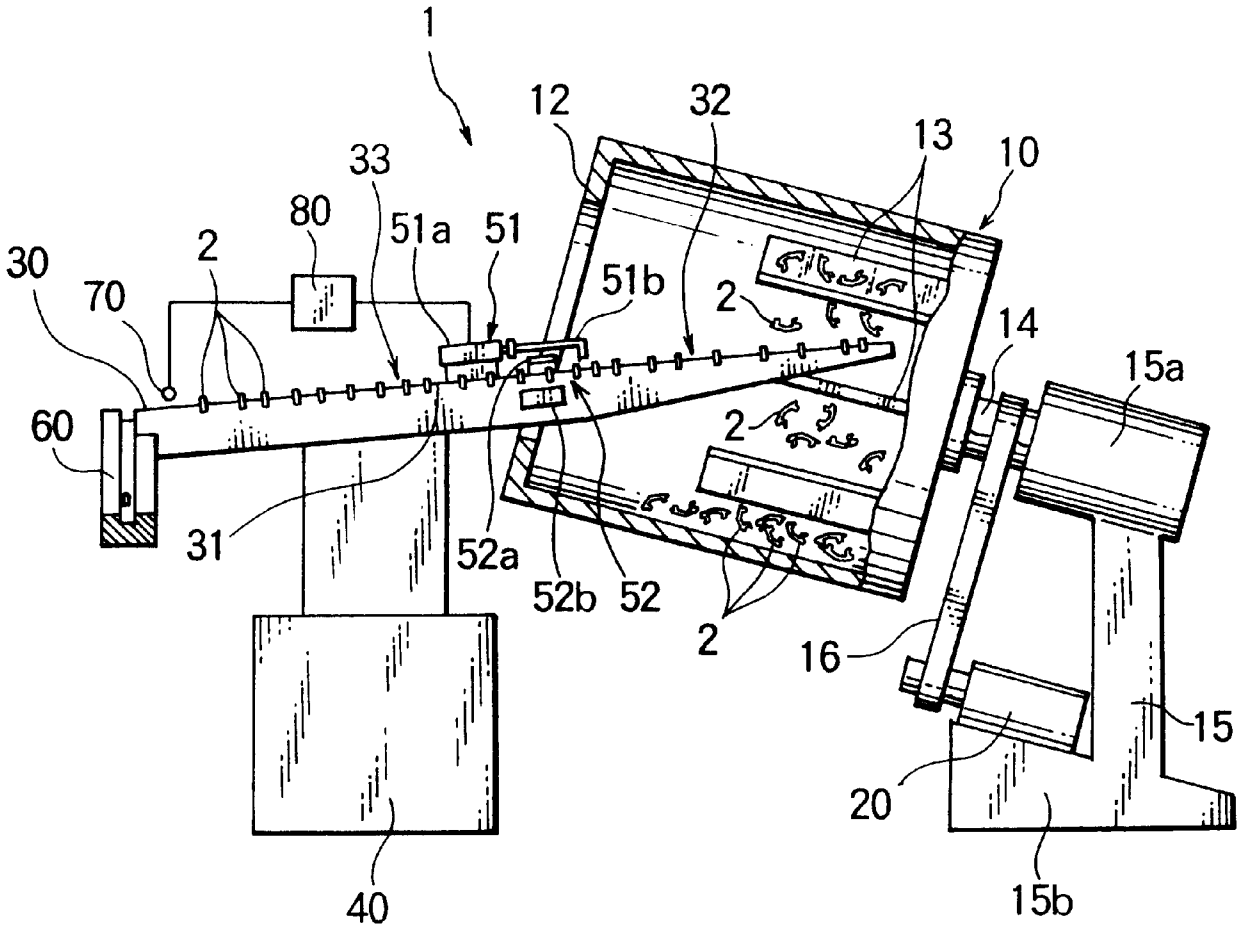
FIG. 1 is a side view, partially broken away, of a parts feeder for retaining parts in correct posture according to a typical embodiment of this invention.

Preferred embodiments of this invention will now be described in detail with reference to the accompanying drawings. FIG. 1 is a side view, partially broken away, of a parts feeder for retaining parts in correct posture according to one embodiment of this invention. The parts feeder of this invention is a parts feeding apparatus for successively feeding locking members 2, each constituting a component of a slide fastener slider, as parts to be fed.

The parts feeder 1 comprises a rotary drum 10 rotatable about its substantially horizontal axis of rotation, an electric motor 20 for driving the rotary drum 10 to rotate, a feed chute 30 for feeding a multiplicity of the locking members 2, which are collected inside the rotary drum 10, in predetermined posture out of the drum 10, a vibrator 40 for vibrating the feed chute 30 longitudinally, and abnormal-posture parts removing means 50 for removing a locking member 2, which is fed in an abnormal posture other than the predetermined posture or remains not advanced on the feed chute 30 during feeding.

The rotary drum 10 is in the form of a cylinder having at one end a bottom plate 11 and at the other end a ring-shape inner flange 12. The rotary drum 10 has on it inside wall a plurality of plates 13 extending radially toward and parallel to its axis of rotation and spaced circumferentially from one another at a predetermined angular distance. Each of the radial plates 13 is a rectangular plate having a pair of opposite short sides, one of which is fixed to the bottom plate 11 and the other left free. The rotary drum 10 is rotatably arranged so as to be inclined by a predetermined angle with respect to the horizontal in such a manner that the side of the bottom plate 11 is at a lower side and the side of the inner flange 12 is at an upper side. With the rotary drum 10 thus inclined, the locking members 2 inside the rotary drum 10 come together to the side of the bottom plate 11 by themselves so that an adequate quantity of the locking members 2 to be fed can be secured by the individual radial plate 13.

A rotary shaft 14 projecting outwardly from the center of the bottom plate 11 of the rotary drum 10 is rotatably supported on an upper support head 15a of a support frame 15 at a predetermined angle with respect to the horizontal. The rotary shaft 14 is operatively connected to the electric motor 20 mounted on a lower base 15b of the support frame 15 and the rotary drum 10 is rotated at a predetermined speed about the rotary shaft 14 by rotation of the electric motor 20. The motor 20 has a non-illustrated speed-reduction mechanism inside.

The feed chute 30 is in the form of an elongated plate, which one end is inserted into the rotary drum 10 so as to extend from the ring-shape inner flange 12 to the vicinity of the bottom plate 11 in the rotary drum and which other end is connected to a transfer chute 60 leading to the next station. The feed chute 30 slightly slopes down to the joint with the transfer chute 60. The feed chute 30, which constitutes a characterizing feature of this invention, has along its upper edge a guide portion 31 of a cross-sectional shape varying in such a manner that the guide portion 31 is divided into a posture control region 32 disposed inside the rotary drum 10 and a posture retention region 33 disposed outside the rotary drum 10.

Figure 3A:
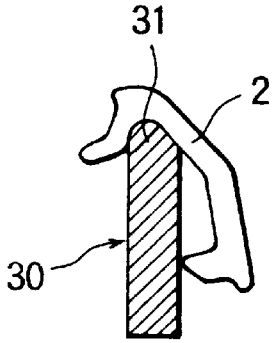
FIGS. 3A, 3B and 3C show the manner in which the postures of parts are controlled while the parts are fed on and along a chute.
Figure 3B:
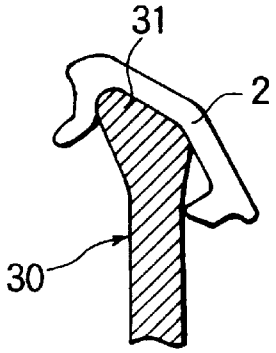

According to this embodiment, the posture control region 32 of the chute 30 gradually decreases in vertical width and thickness toward the rear end (the bottom-plate side of the rotary drum 10) to have a reduced weight. Further, the cross-sectional shape of the posture control region 32 has a taper surface on one side as shown in FIG. 3A and an arcuate surface on the other side so that the locking members 2 dropped from the radial plate 13 can be received by the posture control region 32 with ease, and is gradually changed into a cross sectional shape similar to the shape of the inner surface of the locking member 2 so that the posture of the locking member 2 can be stablized as shown in FIG. 3B.

Figure 3C:
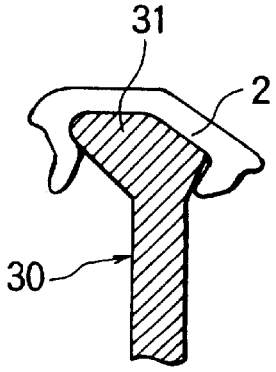

Finally at the outlet of the rotary drum 10, the cross-sectional shape of the posture control region 32 becomes as shown in FIG. 3C. Namely, over the entire length of the posture retention region 33 from the front or downstream end of the posture control region 32, the guide portion 31 has a guide surface complementary in shape to the inside surface of the locking member 2 so as to stably keep the predetermined posture of the locking member 2.

Given that the guide surface of the guide portion 31 of the feed chute 30 has the above-mentioned shape, the posture of the individual locking member 2 dropped from the radial plate 13 onto the guide portion 31 at the rear end of the feed chute 30 is gradually changed to a predetermined posture as it advances along the guide portion 31, and the locking member 2 is supported stably in a correct posture on the guide portion 31. Of course, the locking member 2 received in a non-stable posture on the guide portion 31 at the rear end of the feed chute 30 drops from the guide portion 31, before its posture is retained, and is then accommodated inside the rotary drum 10.

For advancing along the guide portion 31 the locking member 2 received by the guide portion 31 of the feed chute 30, the feed chute 30 is vibrated longitudinally. According to this embodiment, outside the rotary drum 10, the feed chute 30 is supported by the vibrator 40 for direct vibration. The vibrator 40 may be an electromagnetic or mechanical vibrator put on the market. As the feed chute 10 is thus vibrated as well as slopes down to its front end, the locking member 2 is advanced smoothly at a relatively high speed on and along the guide portion 31.

Figure 2:
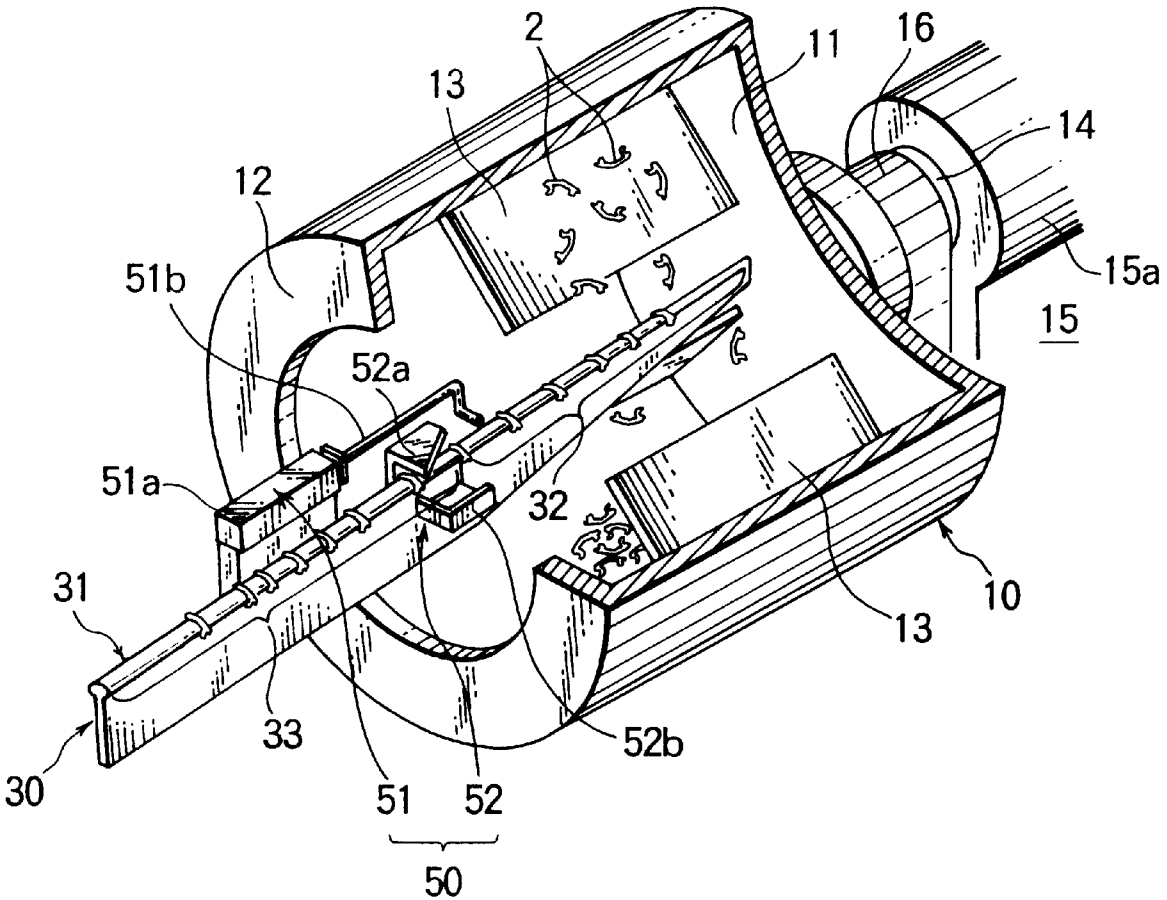
FIG. 2 is a fragmentary perspective view, partially broken away, showing the inside of a rotary drum and a chute of the parts feeder.
Figure 4:
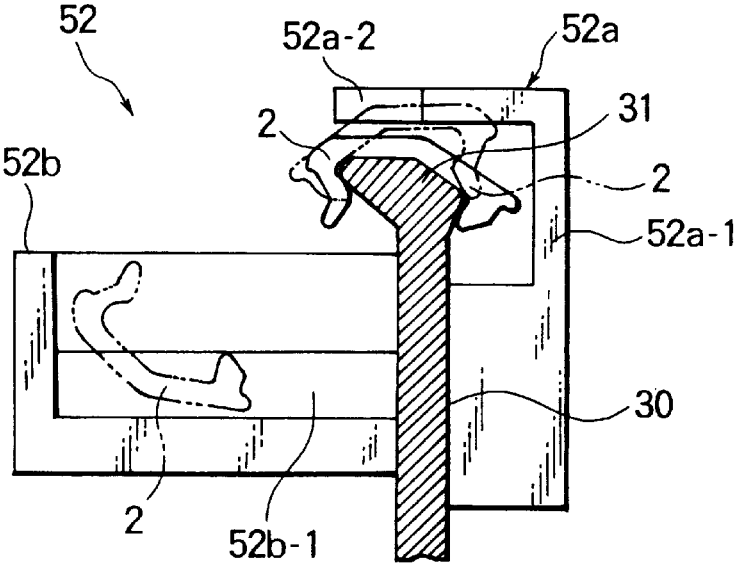
FIG. 4 shows the manner in which parts being fed in abnormal posture is removed from the chute by an abnormal-posture parts removing mechanism.
Figure 5:
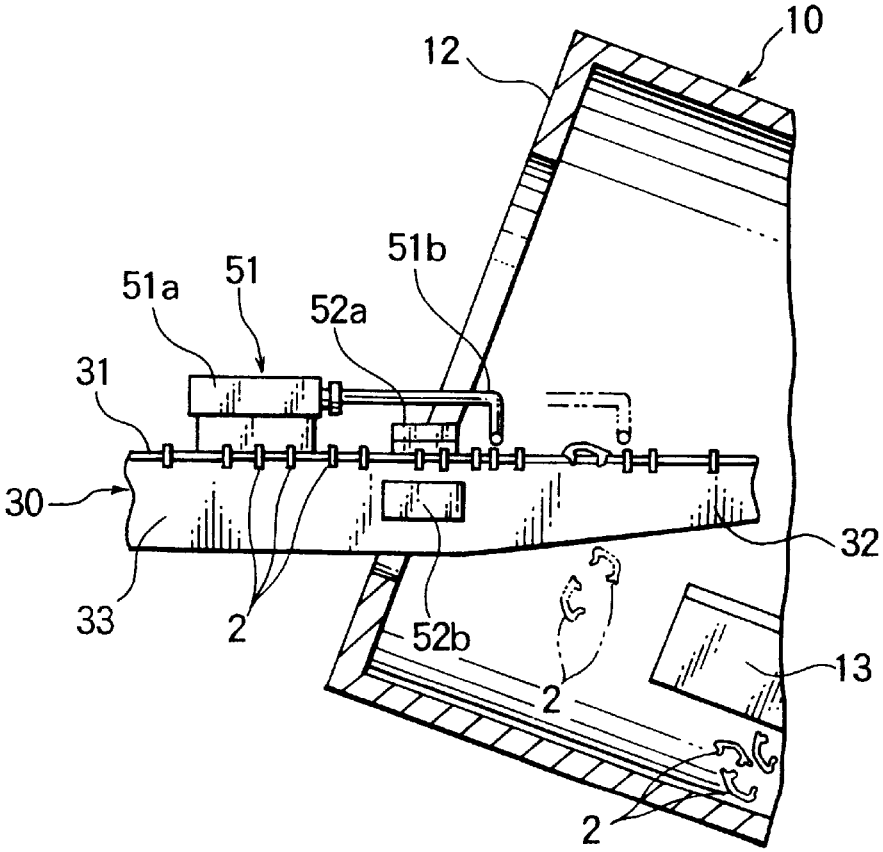
FIG. 5 shows the manner in which stagnant parts are removed by the abnormal-posture parts removing mechanism.

In this embodiment, as shown in FIGS. 2, 4 and 5, removing means 50 for removing parts being fed in abnormal posture other than predetermined posture includes two parts removing mechanisms of different types, stagnant parts removing mechanism 51 for removing parts jammed and stagnated by air pressure from the feed chute 30 and abnormal posture parts removing mechanism 52 for removing abnormal posture parts by a gate member from the feed chute 30. In the illustrated example, the stagnant parts removing mechanism 51, in which an air pipe 51b is attached to a piston rod of an air cylinder 51a, removes the locking members 2, which remain jammed and stagnated on the guide portion by air pressure blown out from the air pipe 51b.

This air-spouting timing is such that air is blown out from the air pipe 51b then stagnation of the locking members 2 occur. For this purpose, in this embodiment, a parts detector 70 is disposed adjacent to the guide portion 31 at the rear end of the feed chute 30, and is operatively connected to a controller 80 for arithmetic processing a detection signal from the parts detector 70 to actuate the air cylinder 51a and thus the air pipe 51b. As the parts detector 70, a photoelectric detector is generally used but any other suitable detector may be applied. According to the illustrated example, when detection by the parts detector 70 comes to a halt for a predetermined time, the controller 80 judges that the locking members 2 remain jammed and stagnated on the guide portion 31 and then actuates the air cylinder 51a and thus the air pipe 51b to blow away the locking members 2, which are jammed within a predetermined range of the guide portion 31, by air pressure. For this purpose, the controller 80 has a timer inside.

In this invention, an L-shape lever, which is not illustrated here, may be substituted for the air pipe 51b. Specifically, the lever, whose end is fixedly connected to the piston rod of the air cylinder 51a and bent over the guide surface of the guide portion 31, is moved in a predetermined range along the guide surface of the guide portion 31 by the actuation of the air cylinder 51a upon receipt of the detection signal from the controller 80, sweeping off the locking members 2 remaining jammed on the guide portion 31.

On the other hand, the second parts removing mechanism 52 removes from the guide portion 31 the locking member 2 traveling on the guide portion 31 of the feed chute 30 if the locking member 2 assumes an abnormal posture out of a predetermined posture. According to the example of FIG. 2, the second parts removing mechanism includes a barrier 52a disposed adjacent to the feed chute 30 at the outlet of the rotary drum 10 for blocking the locking member 2, which is being fed in an abnormal posture, and for dropping the locking member 2 off the guide portion 31, and a gutter 52b for receiving the locking member 2 dropped from the guide portion 31 to return it to inside the rotary drum 10.

The barrier 52a is composed of a restricting plate 52a-1 standing contiguous to one side surface of the feed chute 30 and a removing plate 52a-2 projecting horizontally from the upper end of the restricting plate 52a-1 over the guide portion 31. The restricting plate 52a-1 is a mere rectangular plate, while the removing plate 52a-2 has a substantially trapezoidal shape having a widthwise projecting length gradually increasing such that it does not reach a position above the upper surface of the guide portion 31 on the upstream side and it extends beyond the upper surface of the guide portion 31 on the downstream side.

Further, the gutter 52b is disposed along the side surface of the feed chute 30 in confronting relation to the barrier 52a and has a bottom surface 52b-1 sloping down to the downstream side (the side of the bottom plate 11 of the rotary drum 10) so that the individual locking member 2 dropped onto the sloping bottom surface 52b-1 drops further from the bottom surface 52b-1 to the inside of the rotary drum 10.

According to the parts feeder of the illustrated embodiment, as the electric motor 20 starts driving the rotary drum 10 for rotation, many of the locking members 2 contained in the rotary drum 10 are scooped by the radial plate 13. When the radial plate 13 assumes an inclined posture as it arrives at the upper position, the scooped locking members 2 slide downwardly off the radial plate 13 and are then caught by the guide portion 31 at the rear end of the feed chute 30 located below the radial plate 13. At that time, the feed chute 30 is being vibrated longitudinally by the vibrator 40 to advance the locking members 2 on the guide portion 31 little by little. As long as the individual locking member 2 rides on the guide surface of the guide portion 31 in a predetermined normal posture, the locking member 2 continues moving forward with retaining the predetermined posture according to the variation of cross-sectional shape of the guide portion, until it arrives at the outlet of the rotary drum 10, as mentioned above.

If the locking member 2 is received on the guide portion 31 in a horizontally inverted posture as indicated in phantom lines in FIG. 4, the inverted locking member 2 stands upwardly of the guide portion 31 as it advances along the guide portion 31 to project upwardly beyond the other locking members 2 advancing in the normal posture as indicated in solid lines in FIG. 4. Therefore, the inverted locking member 2 comes against and is guided by the inclined surface of the removing plate 52a-2 of the barrier 52a. As a result, the inverted locking member 2 is swept sideways off the feed chute 30. The swept locking member 2 slides down off the inclined bottom surface 52b-1 of the gutter 52b to return to the inside of the rotary drum 10.

Assuming that a plurality of locking members 2 remain jammed and stagnated on the guide portion 31 as shown in FIG. 5, no further locking member will not arrive at a detection position in which the parts detector 70 is disposed, after the lapse of a certain time. The controller 80 receives detection signals from the parts detector 70 to normally count time until it receives the next detection signal. If the counted time exceeds a preset time, the controller 80 issues an actuation signal for the air cylinder 51a and, at the same time, gives a command for the air pipe 51b to spout out air. Upon receipt of this actuation signal, the air cylinder 51a is actuated and, at the same, the air pipe 51b spouts out air while shifting in a predetermined range along the guide portion 31, thereby sweeping off the feed chute 30 the jammed locking members 2 existing within that range. Alternatively, as mentioned above, an L-shape lever, though it is not illustrated here, may be substituted for the air pipe 51b; in this event, it is possible to remove the stagnated locking members 2 reliably without spouting air and stopping spouting air likewise the air pipe 51b, which is laborious and time-consuming.

Figure 6:
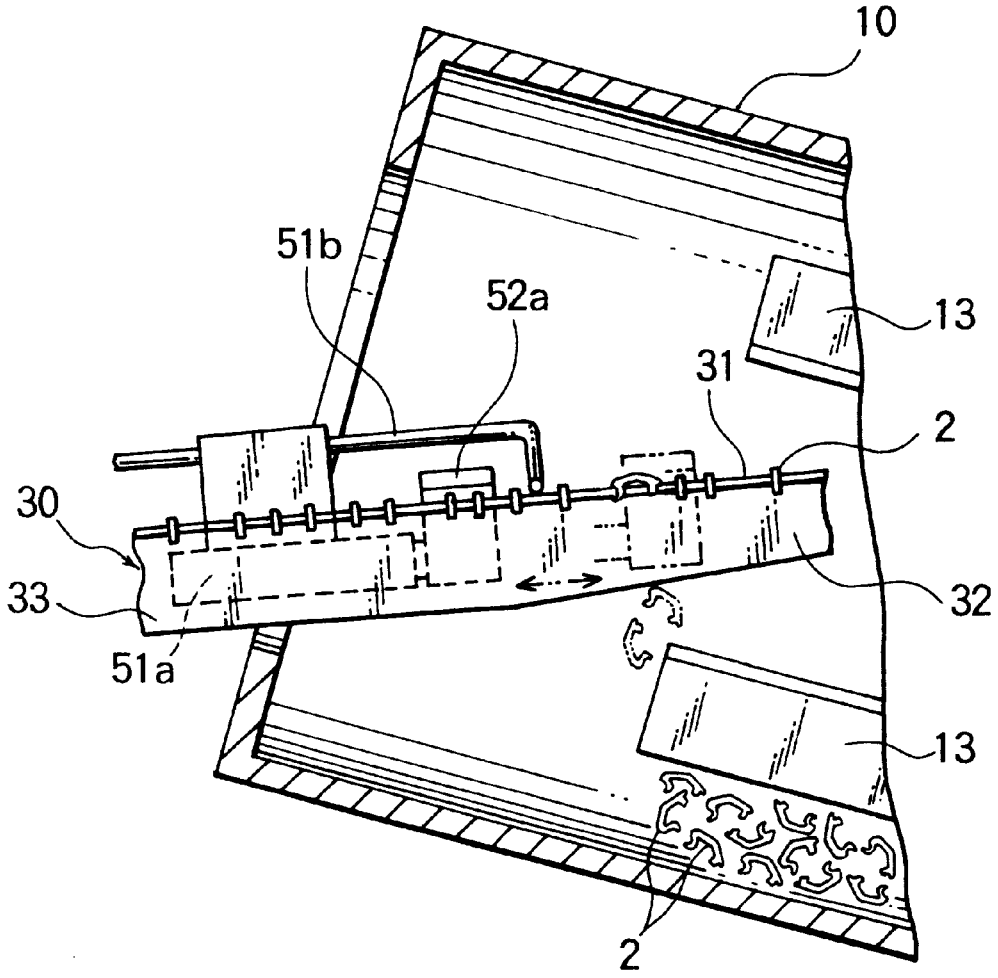
FIG. 6 shows the manner in which parts in abnormal posture are removed from the chute by a modified abnormal-posture parts removing mechanism according to another embodiment of the invention.

FIG. 6 shows a modified example according to another embodiment. This modified example is substantially identical in construction with the previous embodiment except that an air cylinder 51a is connected to the barrier 52a, while an air pipe cylinder 51a is not connected to the air pipe 51b. In this arrangement, it is preferable that air is normally spouted from the air pipe 51b at a predetermined pressure necessary to blow away the abnormal-posture locking member 2 floating from the guide portion 31.

Figure 7:
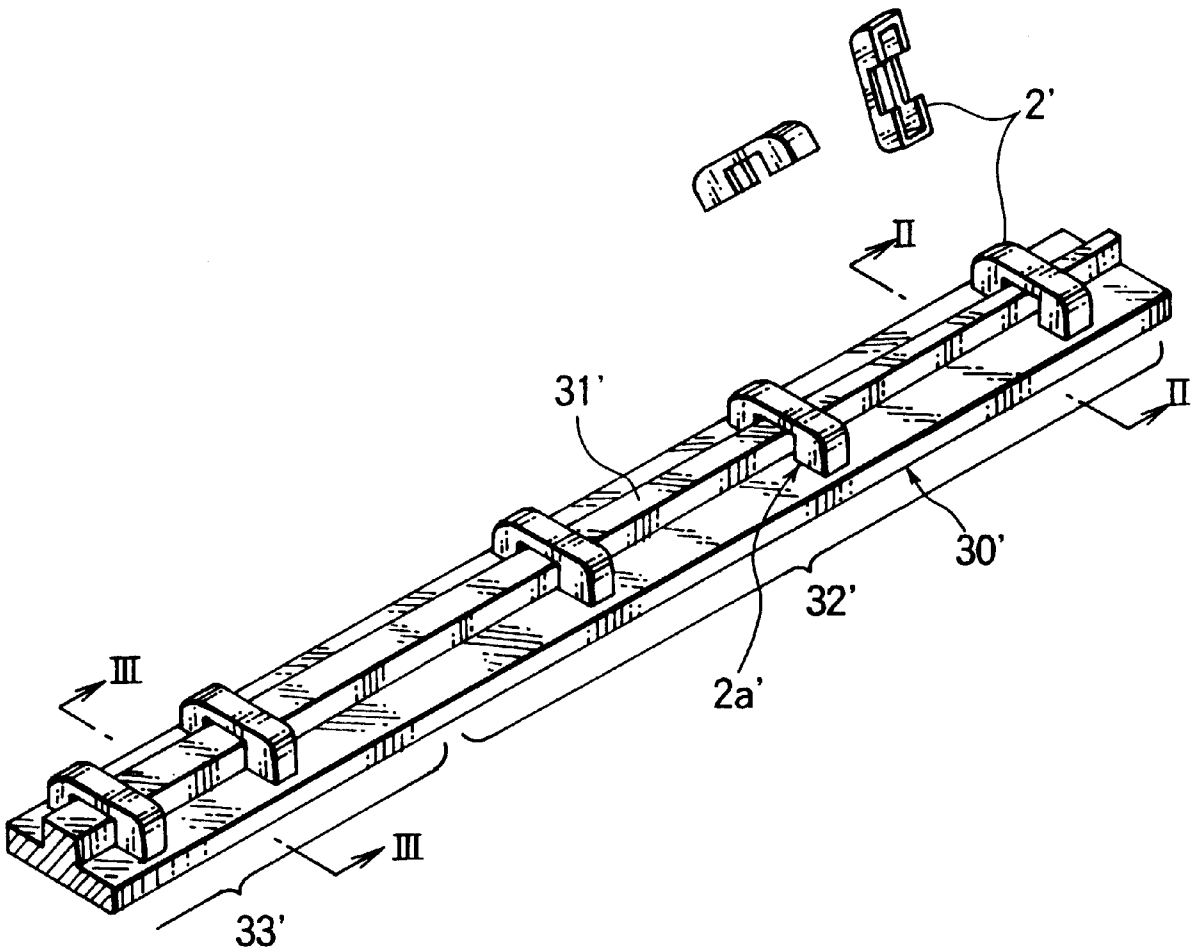
FIG. 7 is a fragmentary perspective view showing the posture in which a succession of slider covers are fed on and along a modified chute according to still another embodiment of the invention.
Figure 8:
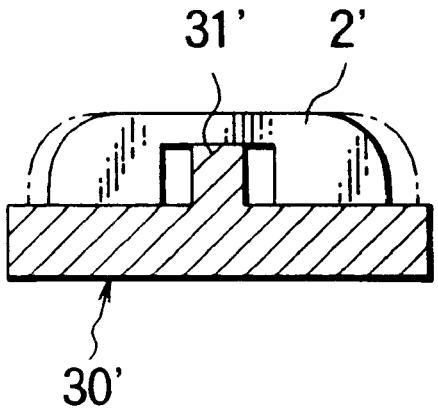
FIG. 8 is a cross-sectional view taken along line of II—II of FIG. 7.
Figure 9:
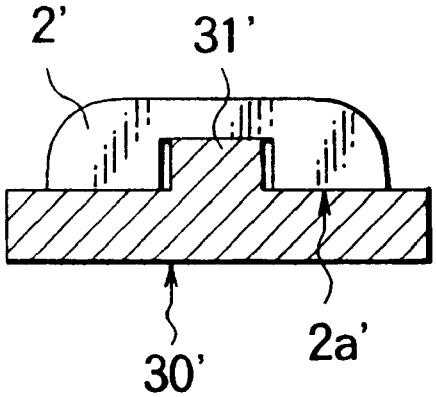
FIG. 9 is a cross-sectional view taken along line of III—III of FIG. 7.

FIGS. 7 through 9 show an embodiment, in which the parts to be fed are slider covers each constituting a component of a slide fastener slider. FIG. 7 shows a modified feed chute 30' for retaining and feeding a succession of slider covers 2' stably in a predetermined posture as well as the manner in which the individual slider covers 2' being fed on the feed chute 30' retains their normal posture. In FIGS. 7 through 9, since the individual slider cover 2' has a generally C shape, it must be fed to the next station with its open end 2a' directed downwardly.

In this embodiment, the feed chute 30' is in the form of an elongated plate like the previous embodiment and has a modified guide portion 31' in the form of a longitudinal rail projecting substantially centrally from the upper surface of the feed chute 30'. This modified guide portion 31', like the previous embodiment, is composed of a posture control region 32' and a posture retention region 33' for the slider cover 2', as in the previous embodiment. The posture control region 32' is set in such a manner that the rear end portion, which is to be inserted in a non-illustrated rotary drum, of the guide portion 31' is reduced in width to a minimum and that its width gradually increases toward the outlet of the rotary drum so as to fit in the recess of the slider cover 2' assuming a normal posture, as shown in FIGS. 7 and 8. In the posture retention region 33' following to the posture control region 32', it has a substantially uniform width throughout its entire length so as to keep fit in the recess of the slider cover 2'.

According to this embodiment, many of the slider covers 2' contained in the non-illustrated rotary drum are scooped from a non-illustrated plate projecting from the inside wall surface of the rotary drum, and then the plate arrives at its upper position as the rotary drum rotates, the slider covers 2' slide down off the plate and are caught by the guide portion 31' at the rear end of the feed chute 30' located below the plate. At the time, likewise the previous embodiment, the feed chute 30' is vibrated longitudinally by a non-illustrated vibrator to advance the slider covers 2' on the guide portion 31' little by little. At that time, the individual slider cover 2' is mounted astride of the guide portion 31', the slider cover 2' is controlled to assume a predetermined posture based on variation of cross-sectional shape of the guide portion 31', as mentioned above, until it arrives at the outlet of the rotary drum as shown in FIG. 7. A succession of slider covers 2' are thereby fed along the guide portion 31' with retaining the same posture.

In this embodiment, like the previous embodiment, the parts feeder also has the same parts removing means. A slider cover 2' being fed in an abnormal posture or a plurality of slider covers 2' remaining jammed and stagnated during feeding are automatically removed off the feed chute by the parts removing means. As is understood from this embodiment, this invention should be no means be limited to the previous examples, in which parts to be fed are slide fastener components, and may be applied to various other parts feeder for various kinds of parts unique in cross-sectional shape.

As is apparent from the foregoing description, according to the parts feeder of this invention, partly since many of the parts of unique cross-sectional shape in the rotary drum substantially horizontally supported are scooped on the plural radial plates projecting from the inside wall of the rotary drum 10, and partly since, in response to rotation of the rotary drum 10, the scooped parts slide down off the radial plate 13 at its upper position to drop and are caught by the longitudinally vibrating rail-like feed chute 30, 30' for positive advancing, it is possible to realize a remarkably increased feeding speed.

Further, since the cross-sectional shape of the guide portion 31, 31' varies gradually to complement to the shapes of inside surfaces of parts 2, 2', it is possible to correct the postures of parts 2, 2', which are supported and are fed on the guide portion 31, 31', little by little so that the individual parts are finally retained in normal posture as fit in the guide portion 31, 31'.

In the meantime, since out of successive parts 2, 2' advancing forward on the guide portion 31, 31', parts assuming abnormal postures, or a plurality of parts remaining jammed and stagnated on the guide portion 31, 31', are removed from the feed chute 30, 30' reliably at good timing by the parts removing means 50 and the controller 80, it is possible to feed the successive parts 2, 2', which are to be supplied to the next station, in normal posture on the feed chute 30, 30'.

What is claimed is:

1. A parts feeder for conveying a succession of parts in a common posture[,] comprising:

(a) a rotary drum rotatable about its substantially horizontal axis of rotation and having on its inner circumferential wall surface a plurality of radial plates circumferentially spaced at predetermined distances;

(b) a feed chute in the form of an elongated plate substantially horizontally extending from an inside to an outside of said rotary drum through an outlet and having a guide portion along its upper edge*, wherein parts are conveyed on said guide portion of said feed chute*;

(c) a vibrator supporting said *feed* chute for[-] vibrating [the] *said feed* chute longitudinally;

(d) a remover disposed adjacent to said guide portion for removing any of the parts if it is abnormal in posture while being conveyed on said guide portion of said *feed* chute; and (e) said guide portion having a parts-supporting cross-sectional shape gradually varying from an inner end of said *feed* chute outwardly toward said outlet of said rotary drum*, wherein said cross-sectional shape gradually varies to complement to a shape of an inside surface of each of the parts to thereby correct a posture of each part little by little*.

2. A parts feeder according to claim 1, wherein said rotary drum has at one end a bottom and is inclined slightly with respect to the horizontal with said bottom on the down side, said chute slightly sloping down from the inner end toward the outside of the drum.

3. A parts feeder according to claim 1, wherein said remover is composed of an abnormal-posture parts removing mechanism for removing parts being conveyed in an abnormal posture on said guide portion and a stagnant parts removing mechanism for removing parts stagnated in said guide portion.

4. A parts feeder according to claim 3, further including a detector disposed adjacent to said guide portion for successively detecting the parts being conveyed on said guide portion, and a controller for measuring a time interval of detection of adjacent parts by said detector and for activating said stagnant parts removing mechanism when said time interval exceeds a preset value.

* * * * *